United States Patent Office 2,752,716
Patented July 3, 1956

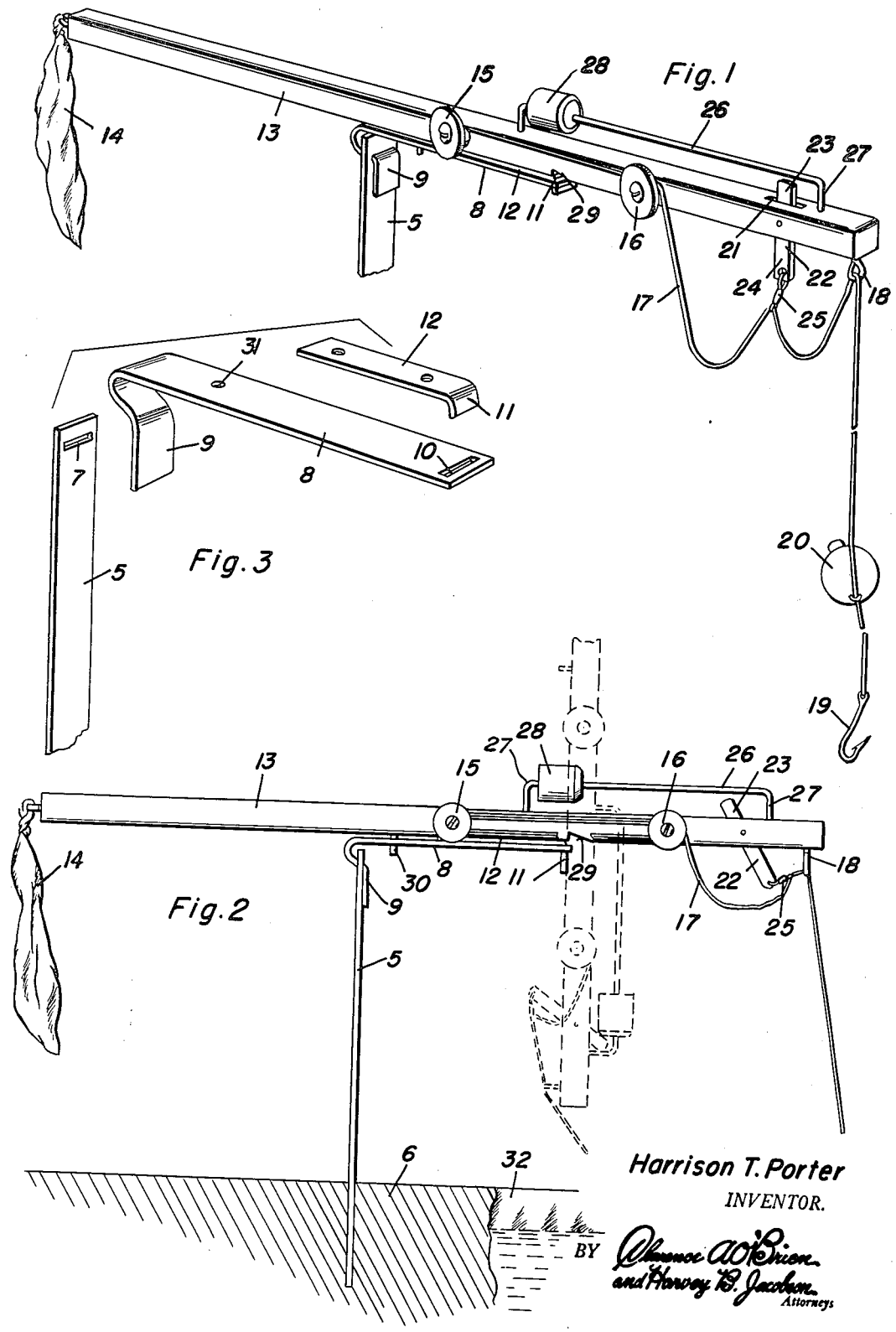

2,752,716

ICE FISHING APPARATUS

Harrison T. Porter, Aberdeen, S. Dak.

Application May 3, 1954, Serial No. 427,039

3 Claims. (Cl. 43—16)

The present invention relates to new and useful improvements in devices for use in fishing through a hole cut in ice, and more particularly to a signalling device actuated through the medium of a fish striking the bait.

An important object of the invention is to provide a fishing apparatus of a knock-down construction to facilitate transportation thereof in a compact form.

A further object is to provide a vertically swingable flag staff actuated by a fish striking the line and including a trip device actuated by a gravity responsive member when the flag staff is raised to jerk the line and set the hook.

A still further object is to provide a device of this character of simple and practical construction, which is efficient and reliable in operation, relatively inexpensive to manufacture and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a side elevational view; and

Figure 3 is a group perspective view of the knock-down pivotal supporting means for the flag staff.

Referring now to the drawing in detail wherein for the purpose of illustration, I have disclosed a preferred embodiment of the invention, the numeral 5 designates a support preferably constructed of a suitable length of strap metal and maintained in an upright position by embedding the lower end of the support in ice 6. The upper portion of the support 5 is formed with a horizontal slot 7 therein in which an arm 8, also of strap metal, is detachably connected by means of a lug 9 formed at one end of the arm to extend at right angles thereto and adapted for insertion in the slot 7 to position the lug at one surface of the support 5 and with the lug passing upwardly through the slot to the opposite surface of the support to position the arm on top of and overlying the upper end of the support.

The other end of arm 8 is also formed with a transverse slot 10 in which a downwardly extending stop tongue 11 is inserted for vertical swinging movement of a strap metal attaching plate 12 on one end of which the tongue 11 is formed.

The plate 12 is secured in a longitudinally extending position to an intermediate portion of a flag staff 13 and to one end of which a flag 14 is suitably secured.

A plurality of spools 15 and 16 are rotatably attached to one side of the flag staff 13 to provide cleats about which a fish line 17 is coiled. The free end of the line 17 extends through an eye 18 at the opposite end of the flag staff from the flag 14, said opposite end of the flag staff constituting the lower end of the flag. A fishhook 19 is attached to the end of the line 17 and a float 20 of suitable construction may also be attached in a predetermined position to the line above the hook.

A longitudinal slot 21 is formed in the lower end of the flag staff 13 at a point between the eye 18 and the adjacent spool 16 and a trigger 22 is pivoted in the slot 21 to provide a relatively short end 23 which projects upwardly above the staff 13 when the latter is in a horizontal position and to provide a relatively long end 24 which extends downwardly below the staff. The line 17 is attached to the lower end 24 of the trigger 22 by means of a clip 25 or other suitable attaching device which tightly grips the line.

A U-shaped guide bar 26 has its leg portions 27 suitably secured to the flag staff 13 to position the guide bar longitudinally of the staff and in spaced parallel relation thereto adjacent the lower end of the staff and with a weight 28 slidably mounted on the guide bar. The relatively short end portion 23 of trigger 22 is positioned in the path of sliding movement of the weight and adjacent the lower end of the guide bar 26 when the flag staff is raised.

A notch 29 is formed in the staff 13 immediately adjacent the outer end of arm 8 to prevent the latter from interfering with the vertical pivotal movement of the flag staff.

A pin 30 is suitably attached to the flag staff 13 to extend downwardly therefrom when the latter is in its horizontal position and the pin enters an opening 31 in arm 8 to prevent turning or twisting of the flag staff on the support.

In the operation of the device, the arm 8 is attached in the upper end of support 5 and the latter is embedded in the ice 6 adjacent a hole 32 cut therein. Tongue 11 of attaching plate 12 is inserted in slot 10 of arm 8 and sufficient play is provided for the tongue to enable the plate and flag staff 13 to swing upwardly. The flag staff is lowered into a horizontal position to rest on arm 8, as shown by full lines in Figure 2, and weight 28 is moved on guide bar 26 toward flag 14 or inwardly of the fulcrum for tongue 11 to normally maintain the staff in its horizontal position.

The line 17 is lowered in the hole 32 in the ice and a fish striking bait on the hook 19 will pull the line and swing the staff 13 into an upright position, as shown by dotted lines in Figure 2. As the staff swings upwardly the weight 28 will slide downwardly on guide rod 26 and cause the weight to strike the trigger 22 and swing the longer end 24 thereof in an upward direction to jerk the line 17 and set hook 19 in the mouth of the fish.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fishing apparatus comprising supporting means including an upstanding supporting member, a flag staff pivotally connected to the upper portion of the supporting means for vertical swinging movement from a horizontal into a vertical position, said flag staff including an upper end and a lower end portion and having a fish line and fishhook attached to lower end thereof to raise the flag staff by a fish pulling on the line, a weight slidably mounted on the flag staff for gravitating movement as the flag staff is raised, and an elongated trigger pivotally connected intermediate its ends to the flag staff and to one end of which the fishing line is attached and said trigger having its other end disposed in the path of downward movement of the weight to swing the trigger in a direction to jerk the line and set the hook upon actuation by the weight.

2. In a fishing apparatus, a vertically swingable staff having a fishing line and fishhook attached to one end thereof to raise the staff by a fish pulling on the line, gravity actuated means carried by the staff, and a fishhook setting device carried by the staff and connected to the line and disposed in the path of downward movement of the gravity actuated means to subject the line to a jerking movement when actuated by said gravity actuated means.

3. The construction of claim 1 and including means carried by the flagstaff for coiling surplus line thereon.

References Cited in the file of this patent

UNITED STATES PATENTS

| | | |
|---|---|---|
| 76,489 | McCaughan | Apr. 7, 1868 |
| 667,932 | Dwigan | Feb. 12, 1901 |
| 1,957,853 | Sibley | May 8, 1934 |
| 2,008,555 | Kovane | July 16, 1935 |
| 2,136,864 | Paquette | Nov. 15, 1938 |
| 2,249,302 | Smith | July 15, 1941 |
| 2,542,253 | King | Feb. 20, 1951 |
| 2,554,927 | Schultz | May 29, 1951 |
| 2,590,721 | Muth | Mar. 25, 1952 |

FOREIGN PATENTS

| | | |
|---|---|---|
| 617,800 | France | Feb. 25, 1927 |